United States Patent [19]

Uchidoi et al.

[11] 4,358,188

[45] Nov. 9, 1982

[54] CAMERA HAVING PROGRAM SHUTTER

[75] Inventors: Masanori Uchidoi; Tadashi Ito, both of Yokohama, Japan

[73] Assignee: Canon Kabushiki Kaisha, Tokyo, Japan

[21] Appl. No.: 39,388

[22] Filed: May 15, 1979

[30] Foreign Application Priority Data

May 19, 1978 [JP] Japan .................................. 53-60430

[51] Int. Cl.³ ...................... G03B 7/087; G03B 7/089; G03B 7/097; G03B 17/18

[52] U.S. Cl. .................................. 354/38; 354/23 D; 354/60 L

[58] Field of Search .................... 354/23 D, 29, 30, 36, 354/38, 43, 44, 50, 51, 60 R, 53, 60 E, 60 L, 289

[56] References Cited

U.S. PATENT DOCUMENTS

| 3,593,629 | 7/1971 | Rentschler | 354/60 R |
| 4,081,813 | 3/1978 | Kawamura et al. | 354/23 D |
| 4,167,313 | 9/1979 | Tsunefuji | 354/38 X |

*Primary Examiner*—William B. Perkey
*Attorney, Agent, or Firm*—Toren, McGeady & Stanger

[57] ABSTRACT

In the disclosed camera with a program shutter, exposure control with a desired combination of shutter time and diaphragm value is made possible without variation of the gradient of the program curve, by shifting the program constant a specific amount.

13 Claims, 5 Drawing Figures 125    5.6

CAMERA HAVING PROGRAM SHUTTER

BACKGROUND OF THE INVENTION

1. Field of the Invention

This invention relates to cameras, and more particularly to improvements of a camera having a program shutter.

2. Description of the Prior Art

Program shutters are known. However, in a camera having a conventional program shutter, when the Ev value determined by the film speed and the brightness of an object being photographed is invariable, that Ev value does not allow the selection of more than one combination of shutter speed and diaphragm aperture. Hence, it has been impossible to operate with an arbitrary value of shutter speed or diaphragm aperture. By providing an additional control circuit for diaphragm priority, or shutter priority exposure, it is of course possible to select an arbitrary value of shutter speed or diaphragm aperture. The drawback of using such a control circuit in the camera is that the circuitry of the camera increases in complexity, and its production cost is also raised. For this reason, proposals have been made to arbitrarily vary the program curve, for example, as in U.S. Pat. No. 4,103,307. However, in these program shutters, it is the gradient of the program curve that is varied. Therefore, the ratio of variation of the shutter time and diaphragm value to the variation of brightness cannot be maintained constant. This is a disadvantage.

Another program shutter which has solved the above drawback by determining the program formula itself on the basis of brightness, and determining a combination of diaphragm aperture and shutter time in accordance with the formula selected by the brightness is disclosed, for example, in DOLS 2645541. Since said program shutter responsive to the brightness selects the formula itself for determining the diaphragm and shutter time, the computation formula for determining the program becomes very complicated. It becomes necessary to perform the computation by using a microprogram and the like. Thus, there is a drawback that a microprocessor must be used as the computing circuit of the camera.

SUMMARY OF THE INVENTION

An object of the present invention is to provide a program shutter capable of selecting an arbitrary program only by varying the constant (K) of the program computation formulae $Av = f(Ev) + K$, and $Tv = f(Ev) - K$.

Another object of the present invention is to provide a program shutter having a member, which, upon operation, gradually varies the constant of the program formulae continuously. When the diaphragm value or shutter time has reached a threshold level in the course of varying the constant of the program formulae, the setting operation of the constant is automatically stopped to insure a proper exposure.

Other objects of the present invention will become apparent from the following detailed description of embodiments.

DESCRIPTION OF THE PREFERRED EMBODIMENTS

Figure 1:
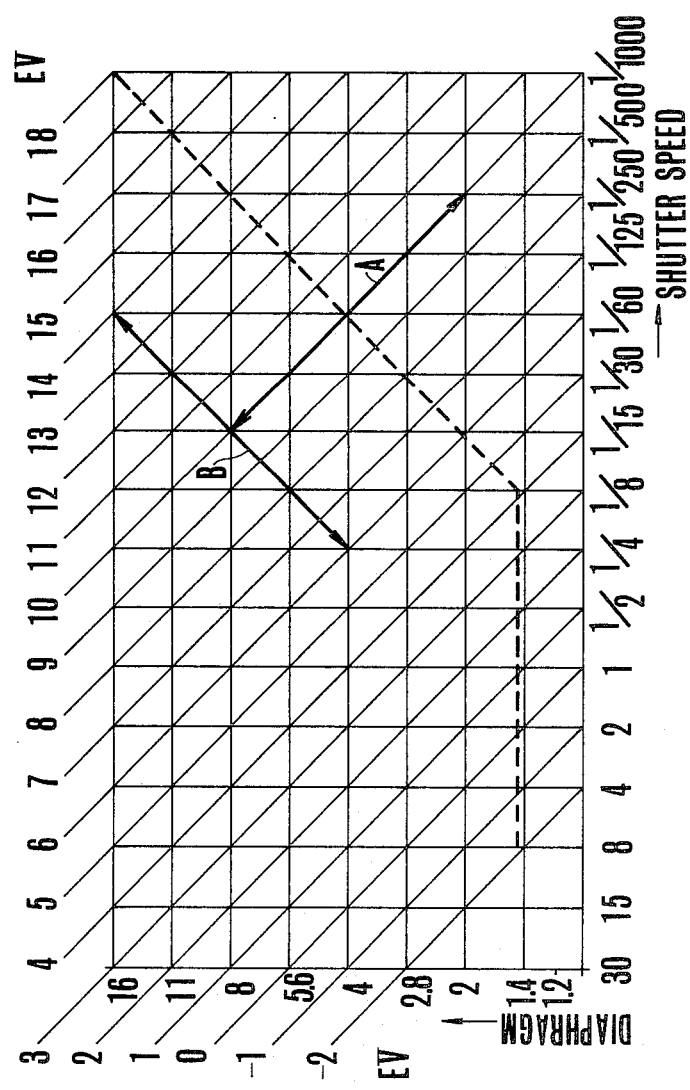
FIG. 1 is a graph for explaining the operation of the present invention.

FIG. 1 shows the principles of the present invention. The abscissa represents shutter speeds from 30 (seconds) to 1/1000 (seconds), and the ordinate represents diaphragm values from $F=1.2$ to $F=16$. The oblique lines labelled by Ev-2 to Ev18 represent Ev values of from $-2$ to 18, and a dashed line represents a relationship between previously programmed shutter speed and diaphragm values. A solid line A represents a relationship between shutter speed and diaphragm values when the photographer forcibly changes this relationship, which is determined as the function of Ev value (in FIG. 1 for instance, Ev is 10). Finally, solid line B represents a relationship between shutter speed and diaphragm values in the case where the brightness of an object being photographed is varied, after the photographer has forcibly changed the relationship between the shutter speed value and diaphragm value as mentioned, but before an exposure is actually taken.

The principle of operation of the camera of the present invention is explained by the use of FIG. 1.

In the conventional program shutter camera, after light measurement for object brightness, computation with the film speed value (hereinafter referred to as Sv) and the object brightness (hereinafter referred to as Bv) is performed to determine an Ev value. Then, a shutter speed value (hereinafter referred to as Tv) and a diaphragm value (hereinafter referred to as Av) are determined based on that Ev value. For example, when $Ev=10$, then in the case of the program shown in FIG. 1, Tv and Av are determined to be 1/60 (seconds) and $F=4$ respectively. It is noted here that these variables Av and Tv take only one value for every one Ev value, and therefore the photographer cannot freely select Tv or Av.

On the other hand, in accordance with the present invention, though the determination of Ev leads to unequivocally determine Tv and Av in accordance with the program shown by the dashed line as in the prior art, suppose that the photographer does not satisfy the computed values of Tv and Av. That combination of Tv and Av can be arbitrarily changed while the Ev remains fixed, since a means is provided for effecting such change. This will be explained by reference to FIG. 1. For example, when $Ev=10$, the relationship between Tv and Av is the same as that in the conventional program shutter, giving a solution of $Av=F/4$, and $Tv=1/60$ (seconds). However, as the relationship between Tv and Av may be changed along the solid line A, a desired different solution, for example, F/5.6 and 1/30 (sec.), or F/2 and $Tv=1/250$, etc. can be freely obtained. Further, after the relationship between Tv and Av is changed as such, when Bv is changed, the relationship between Tv and Av is automatically changed along the dashed line B. Even in this case, a proper exposure can be made.

Further, when the derived value of Av is larger or smaller than the maximum or minimum diaphragm value, the relationship between Av and Tv is changed as shown by the dashed line as in the conventional program shutter, effecting correct exposure.

Figure 2:
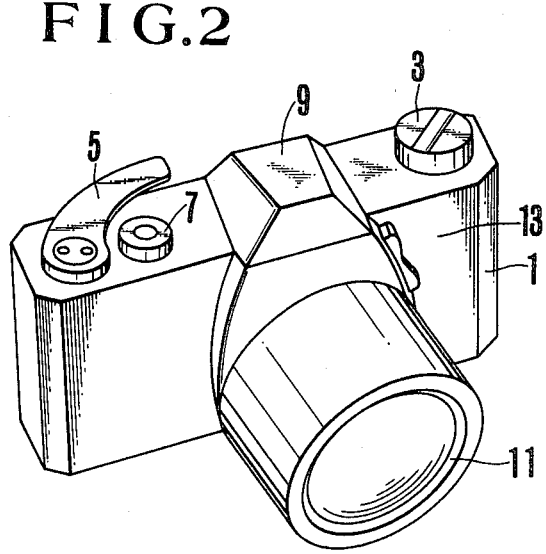
FIG. 2 is a perspective view of a single lens reflex camera to which the present invention is applied.
Figure 3:
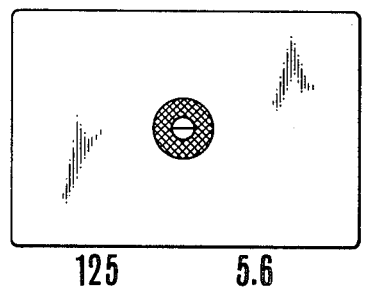
FIG. 3 is a plan view showing the frame of the field of a viewfinder of the camera of FIG. 2.
Figure 5:
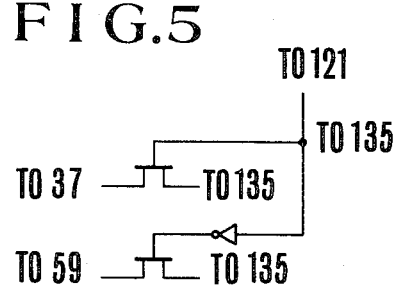
FIG. 5 is an electrical circuit diagram showing a practical example of the switching means 143 of FIG. 4.
Figure 4:
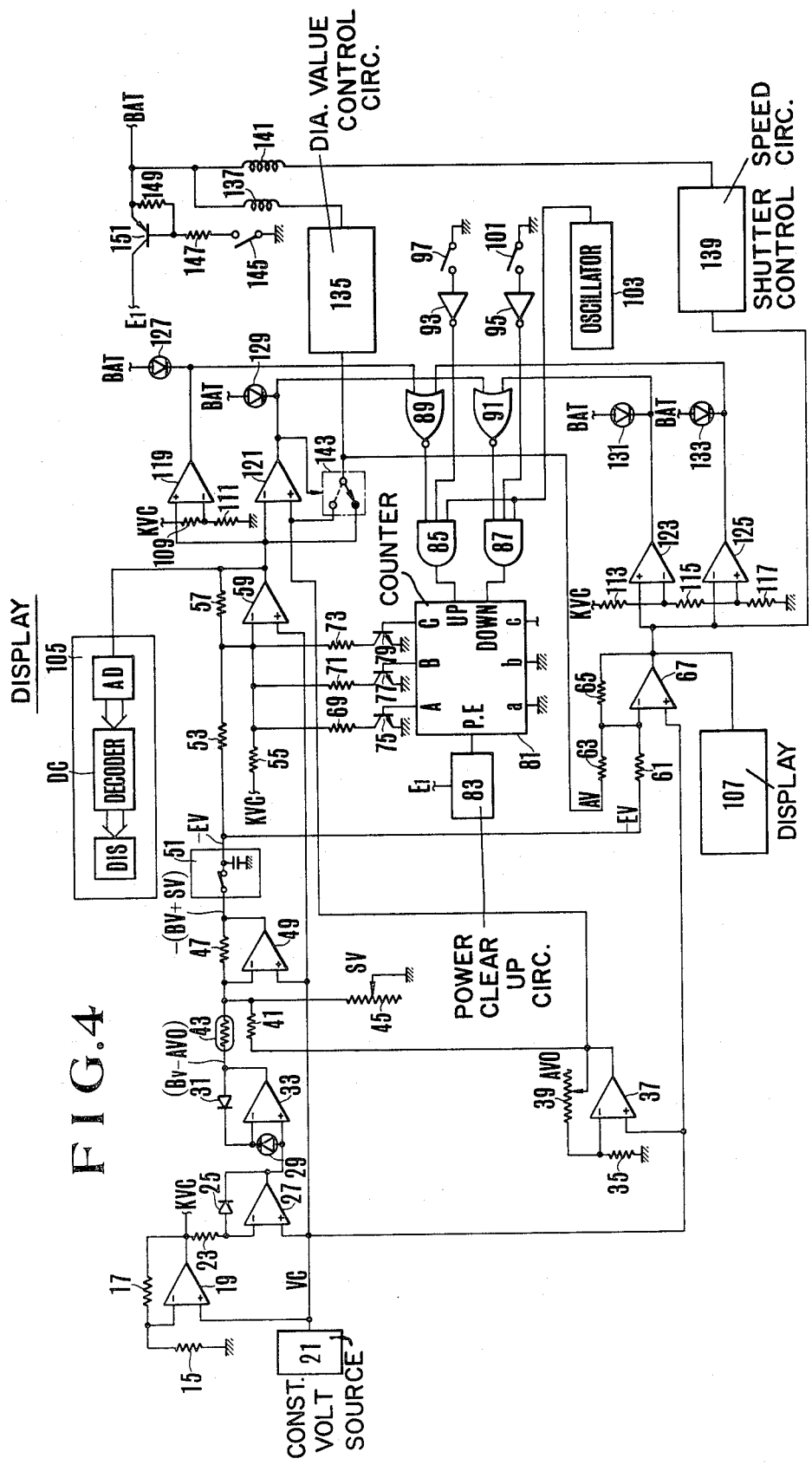
FIG. 4 is an electrical circuit diagram of the camera of FIG. 2.

Referring now to FIGS. 2 to 4, one embodiment of a camera is shown in accordance with the present invention.

FIG. 2 is a perspective view of one embodiment of a single lens reflex camera to which the present invention is applied. On the upper panel of a camera body 1, there are provided, as in the known models, a rewinding lever 3, a winding lever 5, a shutter release button 7, and a pentaprism portion 9. Provided on the front panel, as in other known cameras, is an interchangeable objective lens 11 which is removably attached. A seesaw switch 13 is provided on the mount of the objective lens to change the combination of Tv and Av.

As shown in FIG. 3, below the field of a viewfinder (not shown) of the camera of FIG. 2, a display device shown in FIG. 4 is arranged in a predetermined position so as to display the individual Tv and Av values in digital form.

FIG. 4 shows the circuitry of the camera of FIG. 2. Numerals 15 and 17 represent resistors constituting part of a constant voltage circuit; numeral 19 represents an operational amplifier constituting part of the constant voltage circuit; and numeral 21 represents a constant voltage source. Numerals 23, 25, 27 represent respectively a resistor, diode and an operational amplifier, constituting a temperature compensating circuit. Numerals 29, 31, 33 represent a silicon photo-cell, a logarithmic compression diode and an operational amplifier respectively constituting a light measuring circuit. Numerals 35-41 represent a fully open F-value (hereinafter referred to as Avo) setting variable resistor, fixed resistors and an operational amplifier. A temperature compensation element is represented by 43, and an Sv setting variable resistor by 45. Numerals 47 and 49 represent a resistor and an operational amplifier constituting a signal inverting circuit. A memory circuit 51, such as a capacitor, memorizes a voltage proportional to $-Ev = -(Bv+Sv)$, and has a normally closed memory switch to be opened in response to, for example, actuation of the shutter release. Numerals 53, 55, 57, 59 are three resistors and an operational amplifier constituting an Av determining circuit for determining Av based on Ev and a program constant setting circuit. Three resistors 61, 63, and 65 and an operational amplifier 67 constitute a Tv determining circuit for determining Tv based on Ev and Av. It is noted that the above described Av determining circuit and Tv determining circuit constitute an exposure value determining circuit.

Numerals 69-103 represent various elements constituting an exposure value variable circuit, 69-73 designating resistors, and 75-79 designating npn type transistors. An UP-DOWN counter 81 has inputs, a, b and c, and outputs A, B and C, with the output A for LSB and with the output C for MSB. In addition, member 81 has count-up, count-down and input signal-enable signal input terminals, UP, DOWN, and PE respectively. A power clear-up circuit 83 uses, for example, a one-shot circuit. Numerals 85, 87 represent AND gates, numerals 89, 91 NOR gates, and 93, 95 inverters. Normally, open switches 97 and 101 are cooperative with the above described seesaw switch 13, and 103 represents an oscillator whose output frequency is set at, for example, 1 [Hz]. A display device 105 converts the analogue signal from the operational amplifier 59 to a digital signal which is then displayed in digital form, including an A/D converter AD, a decoder DC and 7-segment display elements. This digital information is displayed in the right-hand bottom portion of the viewfinder as mentioned in connection with FIG. 3. A second display device 107 of the same construction as that of device 105, converts the analogue signal of Tv from the operational amplifier 67 to a digital signal which is then displayed in the digital form. Member 107 includes an A/D converter, decoder and display elements. The output of this device is displayed in the left-hand bottom portion of the viewfinder, as mentioned in connection with FIG. 3.

A voltage dividing circuit composed of resistors 109 and 111 sets the maximum possible diaphragm value (for example, F=16) of the objective lens used. A comparator 119 compares the latter value with the output of the operational amplifier 59. When the output of the operational amplifier 59 exceeds the value representative of the maximum possible diaphragm value, in this instance, F=16, the comparator 119 produces a high-level output (hereinafter referred to as "1" output). A comparator 121 produces a "1" output when the output signal of the operational amplifier 59 represents a diaphragm value in excess of Avo. A comparator 123 receives one of the outputs of a voltage dividing circuit composed of resistors 113, 115 and 117. Between resistors 113 and 115, this voltage is pre-adjusted to a value representative of, for example, Tv=1/1000 (seconds). The comparator 123 produces a "1" in response to the output of the operational amplifier 67 exceeding the level representative of Tv=1/1000 (seconds). Similarly, comparator 125 is receptive to the other outputs of voltage dividing circuit 113, 115, 117, and is pre-adjusted to a value representative of, for example, a shutter speed of 30 seconds. Member 125 is responsive to the excess output of the operational amplifier 67 above the level representative of Tv=30 (seconds), to produce a "1" output.

Numerals 127-133 represent LEDs. A diaphragm value control circuit 135 and a magnetic winding 137 constitute a diaphragm value control device known in the art, for example, in U.S. Pat. No. 4,126,874. A shutter speed control circuit 138 and a rear curtain control magnet 141 constitute a shutter speed control device known in the art. A switch 143 is responsive to change of the output of the comparator 121 to "1" and is capable of being switched from a position shown by the solid line to a position shown by the dashed line. It is noted that this switch 143 is actually constructed in semi-conductor form, but is shown as a mechanical switch for easier comprehension. Numerals 145-151 represent a switch, two resistors and a transistor constituting a voltage supply circuit. Again in FIG. 4, KVC denotes a voltage input terminal connected to the output terminal of the above described voltage supply circuit, and BAT denotes a terminal connected to a battery (not shown).

The operation of the camera of the construction described above is explained below with reference to FIGS. 2 to 4.

At first, when the power switch 145 of FIG. 4 is thrown in response to the depression of the release button 7 of FIG. 2, an output appears at the terminal E₁, and the power clear up circuit 83 also is actuated to set the counter 81 at the initial state. Thus, all the circuit takes the initial state. In other words, since "0" is applied to the input terminals a and b, and "1" to the terminal c, the actuation of the power clear-up circuit leads to the production of "0" from the output terminals A and B and "1" from C. At the same time, the light measuring circuit starts to operate with the result that a signal corresponding to (Bv−Avo) is produced from the output terminal of the operational amplifier 33. Since the resistor 45 has a resistance value previously related to Sv, and the resistor 39 likewise, of Avo, these signals are computed by the operational amplifier 49 to produce an output signal corresponding to −Ev=(Bv+Sv).

Here, the output C of the counter 81 is "1" at which the transistor 79 is ON, and the resistance values of the resistors 73 and 55 are set so that when a signal −Ev is produced in the memory circuit 51, the output of the operational amplifier 59 represents Av=(Ev/2)−1. Thus, when a signal −Ev appears at the output terminal of the memory circuit 51, the output signal of the operational amplifier 59 is applied through the selector switch 143 and resistor 63 to the operational amplifier 67. Computation is then performed in the latter with the signal corresponding to −Ev fed through the resistor 61. At the output terminal of the operational amplifier 67, an output signal appears, corresponding to Tv=(Av−Ev). The analogue Av and Tv signals produced from the operational amplifiers 59 and 67, after having been converted to digital signals by the display devices 105 and 107, are displayed in digital form through the finder as shown in FIG. 3. Up to this point, the operation is the same as that of the conventional program shutter. When the photographer desires different Av and Tv values from those displayed in the finder, the seesaw switch 13 of FIG. 2 may be operated to that effect. For example, when the upper portion of the seesaw switch 13 is depressed, the switch 97 of FIG. 4 is closed. At this time, the output signals of the operational amplifiers 59 and 67, which represent Av and Tv, are assumed to fall within the normal range. Then, the outputs of the comparators 119 and 125 are "0". Therefore, the output pulses from the oscillator 103 are applied through the AND gate 85 to the count-up input terminal UP, causing the content of the counter 81 to increase. In response, the transistors 75 and 77 are rendered conductive. When two pulses from the oscillator 103 have passed through the AND gate 85, the transistor 77 is turned on. Thus, the output of the operational amplifier 59 becomes Av=(Ev/2)+1, and the diaphragm value is shifted two stops. For example, if Av=Ev/2−1 represents F=4, the shifted value is F=8. The described output change of the operational amplifier 59 also causes the output signal Tv of the operational amplifier 67 to be shifted two stops. This means that depression of the seesaw switch 13 moves the relationship between Tv and Av along the solid line A of FIG. 1. When the output signals of the operational amplifiers 59 and 67 have shifted two stops as mentioned, the respective displayed values in the viewfinder are also changed two increments. When displays in the finder correspond with those desired by the photographer, the seesaw switch 13 must be returned to the intermediate position. Thus, the switch 97 is released from the closed state to gate off the AND gate 85. After that, the photographer may further depress the shutter release button. The diaphragm aperture in the objective lens 11 is controlled in accordance with the operational amplifier 59 through the control circuit 135 and magnet 137. Further, the shutter speed is controlled in accordance with the output signal of the operational amplifier 67 through the control circuit 139 and magnet 141. Thus, the exposure is obtained with a correct exposure value.

Again, when Bv is changed after the combination of Av and Tv has been altered as mentioned in FIG. 1, the output −Ev of the memory circuit 51 changes with Bv along with the outputs Av, Tv, that is, Ev of the operational amplifiers 59 and 67. As has been mentioned in FIG. 1, even in this case, the correct exposure is obtained.

While the switch 97 continues to be depressed, the output signal Av of the operational amplifier 59 becomes a smaller diaphragm value than the voltage set in the voltage dividing circuit 109, 111, for example, F=16, and the output of the comparator 119 goes from "0" to "1". Thus, the output of the NOR gate 89 is changed from "1" to "0", and the AND gate is gated off. The output signal Av of the operational amplifier 59 is therefore fixed in the minimum diaphragm value.

At this time, since the output of the comparator becomes "1", the LED 127 is extinguished, the diaphragm value is controlled to the minimum, and the shutter time is controlled in correspondence with the minimum diaphragm value. It is thus possible to take a picture with a correct exposure value.

Again, while depressing the switch 97 as mentioned above, when the shutter time reaches its longest value or 30 seconds, the output of the comparator 125 becomes "1" with production of "0" from the NOR gate 89. The AND gate 85 is thus gated off to inhibit counting by the counter 81 as mentioned. In this case, therefore, the shutter time is first determined to be 30 seconds, and then the diaphragm is controlled in accordance with this shutter time. It is noted that in this case the LED 133 is quenched, informing the photographer of the fact that the shutter time has reached its longest value.

The foregoing has been described for depression of the upper portion of the seesaw switch 13. When the seesaw switch 13 is depressed at the lower portion, the switch 101 is turned on, causing pulses from the oscillator 103 to be directed through the AND gate 87 to the counter 81 at its count-down input. Now assuming that the counter 81 is fed with two pulses, then the content of the counter 81 becomes "0,1,0", and "1" is produced from its output terminal B. For this reason, the transistor 77 is turned on to connect the resistor 71, instead of the resistor 73, to the operational amplifier 59. Thus, the output of the latter is changed from Av=Ev/2−1 to Av=Ev/2−3, and the diaphragm value is shifted two stops. If Av=Ev/2−1 represents F=4 as has been mentioned above, the result is F=2. At this time, the shutter time also is shifted two stops. This means that a downward movement is affected along the solid line A of FIG. 1. Thus, the program is varied. The closure of the switch 101 continues to count down the content of the counter 81. When the output of the operational amplifier 59 exceeds the Avo set in the resistor 39, for example, if Avo=F/1.4, when the output of the operational amplifier 59 reaches a value corresponding to F=1.4, the comparator 121 produces a "1" output and "0" is fed through the NOR gate 91 to the AND gate 87. Therefore, the counter 81 stops counting down, and the LED 129 is quenched, indicating that the diaphragm value is at the limit value Avo. Also, the output of the comparator 121 moves the selector switch 143 from the position shown by the solid line to that indicated by the dashed line. In this case, the Avo information from the operational amplifier 37 is fed through the switch 143 to the control circuit 135, and the diaphragm is controlled based on the Avo information. Again, since the Avo information is applied to the amplifier 67, the shutter speed is also controlled based on the Avo information.

In the course of maintaining the counter 81 to be counting down, when the shutter speed reaches the shortest value, for example, 1/1000 second, the output of the comparator 123 changes to "1", at which the LED 131 is quenched, indicating that the shutter speed is at its shortest and the AND gate 87 is closed to stop the operation of the counter 81. Thus, the shutter time is controlled by the shortest time, and the diaphragm value is determined in accordance with this shortest shutter time to control the diaphragm. This effects a correct exposure.

It is noted that in the embodiment of FIG. 4, the control is based on the Apex computation by the program formulae: $AV=(Ev/2)-K$, $Tv=(Ev/2)+K$, but if the Apex computation is substituted by a computation with the actual diaphragm value and shutter time value, the additive and subtractive operators in the formulae are naturally multiplicative and divisional operators.

As has been described in detail, in the camera having the program shutter according to the present invention, it is possible, by changing only the constant in the program formulae, to select an arbitrary combination of diaphragm values and shutter times under variation in a constant ratio, thereby giving many advantages to the camera with the program shutter.

What is claimed is:

1. A camera comprising:
   (a) a light sensitive circuit for producing an output signal corresponding to an exposure value Ev;
   (b) a memory circuit for memorizing the output signal;
   (c) a computing circuit responsive to the memory means and computing a combined value of a shutter time value and a diaphragm value;
   (d) constant number setting means for setting an arbitrary constant number and adding the set constant number to one of the shutter time value and the diaphragm value in the computing circuit, and subtracting the set constant number from the other value in said computing circuit; and
   (e) a shutter time control circuit for controlling the shutter time on the basis of the output of said computing circuit corresponding to a shutter time value;
   (f) a diaphragm control circuit for controlling the diaphragm on the basis of the output corresponding to the diaphragm value from the computing circuit;
   (g) a signal forming circuit for producing a limit value signal corresponding to a limit value of a diaphragm;
   (h) a stop signal forming circuit responsive to the diaphragm value computed by said computing circuit and said limit value signal for producing a stop signal upon establishment of a predetermined relationship between the diaphragm value and limit value; and
   (i) inhibiting means responsive to said stop signal for inhibiting the constant setting operation of the constant setting means.

2. A camera having a program shutter including:
   (a) a light sensitive circuit for producing an output signal corresponding to an exposure value Ev;
   (b) a memory circuit for memorizing the output of the light sensitive circuit;
   (c) a computing circuit for deriving a diaphragm value $AV=f(Ev)+K$, and shutter time value $Tv=f(Ev)-K$ on the basis of the output of said memory circuit, where K is a constant;
   (d) constant setting means coupled to the computing circuit for setting the value K at an arbitrary value;
   (e) a shutter time control circuit for controlling the shutter time on the basis of the output of said computing circuit corresponding to a shutter time value;
   (f) a diaphragm control circuit for controlling the diaphragm on the basis of the output corresponding to the diaphragm value from the computing circuit;
   (g) a signal forming circuit for producing a limit value signal corresponding to a limit value of a diaphragm;
   (h) a stop signal forming circuit for detecting an output corresponding to the diaphragm value computed by said computing circuit and said limit value signal upon establishment of a predetermined relationship between both of the output signals to produce a stop signal; and
   (i) inhibiting means responsive to said stop signal for inhibiting the constant setting operation by said constant setting means.

3. A camera comprising:
   (a) a light sensitive circuit for producing an output signal corresponding to an exposure value Ev;
   (b) a memory circuit for memorizing the output signal;
   (c) a computing circuit responsive to the memory means and computing a combined value of a shutter time value and a diaphragm value;
   (d) constant number setting means for setting an arbitrary constant number and adding the set constant number to one of the shutter time value and the diaphragm value in the computing circuit, and subtracting the set constant number from the other value in said computing circuit; and
   (e) a shutter time control circuit for controlling the shutter time on the basis of the output of said computing circuit corresponding to a shutter time value;
   (f) a diaphragm control circuit for controlling the diaphragm on the basis of the output corresponding to the diaphragm value from the computing circuit;
   (g) a signal forming circuit for producing a limit value signal corresponding to the limit value of shutter time to be controlled;
   (h) a stop signal forming circuit responsive to the shutter time value computed by said computing circuit and said limit value signal for producing a stop signal upon establishment of a predetermined relationship between the limit value signal and the shutter time value; and
   (i) inhibiting means responsive to said stop signal for inhibiting the constant setting operation of said constant setting means.

4. A camera having a program shutter including:
   (a) a light sensitive circuit for producing an output signal corresponding to an exposure value Ev;
   (b) a memory circuit for memorizing the output of the light sensitive circuit;
   (c) a computing circuit for deriving a diaphragm value $AV=f(Ev)+K$, and a shutter time value Tv=f(Ev)−K on the basis of the output of said memory circuit, where K is a constant;

(d) constant setting means coupled to the computing circuit for setting the value K at an arbitrary value;

(e) a shutter time control circuit for controlling the shutter time on the basis of the output of said computing circuit corresponding to a shutter time value;

(f) a diaphragm control circuit for controlling the diaphragm on the basis of the output corresponding to the diaphragm value from the computing circuit;

(g) a signal forming circuit for producing a limit value signal corresponding to the limit value of shutter time to be controlled;

(h) a stop signal forming circuit responsive to the shutter time value computed by said computing circuit and said limit value signal for producing a stop signal upon establishment of a predetermined relationship between the limit value signal and the shutter time value; and (i) inhibiting means responsive to said stop signal for inhibiting the constant setting operation by said constant setting means.

5. A camera comprising:
(a) a light sensitive circuit for producing an output signal corresponding to the brightness of an object;
(b) a computing circuit responsive to the output of said light sensitive circuit for determining outputs representing shutter time and diaphragm aperture;
(c) shift information setting means for setting shift information into said computing circuit and for shifting the shutter time and diaphragm value on the basis of the shift information;
(d) an exposure control circuit for controlling the shutter time and diaphragm on the basis of the output of said computing circuit; and
(e) stopping means for stopping the shift information setting operation of said setting means when the shutter time value from the computing circuit reaches a predetermined limit shutter time value.

6. A camera as in claim 5, further comprising display means for displaying the shutter time value and diaphragm value on the basis of the output of said computing circuit.

7. A single lens reflex camera comprising:
(a) a light sensitive circuit for producing an output signal corresponding to an exposure value Ev;
(b) a computing circuit responsive to the output signal for computing a combination of shutter time value and a diaphragm value and for producing an output voltage corresponding to the shutter time value and an output voltage corresponding to the diaphragm value;
(c) shift information means including a plurality of resistors;
(d) operating means;
(e) counter means for performing a counting operation when said operating means is actuated and producing a constant value;
(f) a connecting circuit for sequentially connecting the resistors to said computing circuit with the counting operation of the counter means, so that said computing circuit shifts an output voltage of the computing circuit corresponding to the connected resistance value;
(g) holding means for maintaining the output voltage of the computing circuit; and (h) an exposure control circuit for controlling the diaphragm and shutter time on the basis of the output voltage as maintained by the holding means.

8. A camera comprising:
(a) a light sensitive circuit for producing an output signal corresponding to an exposure value Ev;
(b) a computing circuit responsive to the output signal and computing a combined value of a shutter time value and a diaphragm value;
(c) setting means for setting shift information in said computing circuit and shifting the shutter time value and a diaphragm value on the basis of the shift information;
(d) a shutter time control circuit for controlling the shutter time on the basis of the output of said computing circuit corresponding to a shutter time value;
(e) a diaphragm control circuit for controlling the diaphragm on the basis of the output corresponding to the diaphragm value from the computing circuit;
(f) a signal forming circuit for producing a limit value signal corresponding to a limit value of a diaphragm;
(g) a stop signal forming circuit responsive to the diaphragm value computed by said computing circuit and said limit value signal for producing a stop signal upon establishment of a predetermined relationship between the diaphragm value and limit value; and
(h) inhibiting means responsive to said stop signal for inhibiting the shift information setting operation of the setting means.

9. A camera as in claim 8, further comprising display means for displaying the shutter time value and diaphragm value based on the values computed by said computing circuit.

10. A camera including:
(a) a light sensitive circuit for producing an output signal corresponding to an exposure value Ev;
(b) a computer circuit for deriving a diaphragm value AV=f(Ev)+K, and a shutter time value Tv=f(Ev)−K on the basis of the output of said light sensitive circuit, where K is a constant;
(c) constant setting means coupled to the computing circuit for setting the value K at an arbitrary value;
(d) a shutter time control circuit for controlling the shutter time on the basis of the output of said computing circuit corresponding to a shutter time value;
(e) a diaphragm control circuit for controlling the diaphragm on the basis of the output corresponding to the diaphragm value from the computing circuit;
(f) a signal forming circuit for producing a limit value signal corresponding to a limit value of a diaphragm;
(g) a stop signal forming circuit for detecting an output corresponding to the diaphragm value computed by said computing circuit and said limit value signal upon establishment of a predetermined relationship between both of the output signals to produce a stop signal; and
(h) inhibiting means responsive to said stop signal for inhibiting the constant setting operation of said constant setting means.

11. A camera comprising:

(a) a light sensitive circuit for producing an output signal corresponding to an exposure value Ev;

(b) a computing circuit responsive to the output signal and computing a combined value of a shutter time value and a diaphragm value;

(c) setting means for setting shift information in said computing circuit and shifting the shutter time value and a diaphragm value on the basis of the shift information;

(d) a shutter time control circuit for controlling the shutter time on the basis of the output of said computing circuit corresponding to a shutter time value;

(e) a diaphragm control circuit for controlling the diaphragm on the basis of the output corresponding to the diaphragm value from the computing circuit;

(f) a signal forming circuit for producing a limit value signal corresponding to the limit value of shutter time to be controlled;

(g) a stop signal forming circuit responsive to the shutter time value computed by said computing circuit and said limit value signal for producing a stop signal upon establishment of a predetermined relationship between the limit value signal and the shutter time value; and (h) inhibiting means responsive to said stop signal for inhibiting the shift information setting operation of said setting means.

12. A camera comprising:

(a) a light sensitive circuit for producing an output signal corresponding to an exposure value Ev;

(b) a computer circuit for deriving a diaphragm value $AV=f(Ev)+K$, and a shutter time value $Tv=f(Ev)-K$ on the basis of the output of said light sensitive circuit, where K is a constant;

(c) constant setting means coupled to the computing circuit for setting the value K at an arbitrary value;

(d) a shutter time control circuit for controlling the shutter time on the basis of the output of said computing circuit corresponding to a shutter time value;

(e) a diaphragm control circuit for controlling the diaphragm on the basis of the output corresponding to the diaphragm value from the computing circuit;

(f) a signal forming circuit for producing a limit value signal corresponding to the limit value of shutter time to be controlled;

(g) a stop signal forming circuit responsive to the shutter time value computed by said computing circuit and said limit value signal for producing a stop signal upon establishment of a predetermined relationship between the limit value signal and the shutter time value; and (h) inhibiting means responsive to said stop signal for inhibiting the constant setting operation by said constant setting means.

13. A single lens reflex camera comprising:

(a) a light sensitive circuit for producing an output signal corresponding to an exposure value Ev;

(b) memory means for memorizing the output signal;

(c) a computing circuit responsive to the output signal for computing a combination of shutter time value and a diaphragm value and for producing an output voltage corresponding to the diaphragm value;

(d) shift information means including a plurality of resistors;

(e) operation means for starting an operation;

(f) counter means for performing a counting operation when said operating means is actuated;

(g) a connecting circuit for selecting one of the resistors and connecting the selected resistor to said computing circuit on the basis of the count value of the counter means, so that the output voltages of said computing circuit are shifted in correspondence to the selected resistance value; and (h) an exposure control circuit for controlling the diaphragm and shutter time on the basis of the output signals of the computing circuit.

* * * * *